United States Patent [19]
Schott et al.

[11] 3,876,926
[45] Apr. 8, 1975

[54] THICK-FILM VOLTAGE REGULATOR FOR THREE-PHASE ALTERNATORS

[75] Inventors: Werner Schott, Ottobrunn; Dieter Pilz, Munich; Reiner Weidlich, Unterhaching; Peter Fickenscher; Elmar Schmid, both of Munich; Herbert Reinl, Taufkirchen, all of Germany

[73] Assignee: Siemens Aktiengesellschaft, Berlin & Munich, Germany

[22] Filed: Nov. 19, 1973

[21] Appl. No.: 416,860

[30] Foreign Application Priority Data
Feb. 5, 1973 Germany............................ 2305484

[52] U.S. Cl............ 322/28; 174/52 PE; 317/101 C; 317/120
[51] Int. Cl. ............................................ H02p 9/30
[58] Field of Search ...... 322/28, 70; 307/10 R, 153, 307/303; 317/100, 101 R, 101 C, 120; 174/52 PE

[56] References Cited
UNITED STATES PATENTS
| | | | |
|---|---|---|---|
| 3,106,665 | 10/1963 | Byles............................... | 307/10 R |
| 3,439,255 | 4/1969 | Carnes et al........................ | 322/28 |
| 3,501,582 | 3/1970 | Heidler et al................... | 174/52 PE |
| 3,532,962 | 10/1970 | Balcke et al........................ | 322/28 |
| 3,539,907 | 11/1970 | Linstedt............................. | 322/28 |
| 3,582,762 | 6/1971 | Mori et al........................... | 317/100 |
| 3,596,115 | 7/1971 | Conzelmann...................... | 307/303 |

OTHER PUBLICATIONS
Motorola Service Manual, 25-51, "MA/MH' & MR' Series Alternator Systems," Mar., 1969.

Primary Examiner—William H. Beha, Jr.
Attorney, Agent, or Firm—Hill, Gross, Simpson, Van Santen, Steadman, Chiara & Simpson

[57] ABSTRACT

A thick-film voltage regulator for the electrical system of an automobile or the like incorporates a housing formed of heat-conductive material with cooling ribs, and an encapsulated portion through which conductors pass for interconnection with other components of the electrical system. The regulator control circuit is a thick-film hybrid circuit formed on an insulating substrate and having burned-in conductor paths and resistors with discrete capacitors and semiconductors being connected thereto. A zener diode is incorporated for overvoltage protection on a separate metallic substrate mounted adjacent to the insulating substrate, and both substrates are supported on the housing in good heat-conducting relationship therewith.

4 Claims, 7 Drawing Figures

THICK-FILM VOLTAGE REGULATOR FOR THREE-PHASE ALTERNATORS

BACKGROUND

1. Field of the Invention

The present invention relates to regulator units and, more particularly, to regulator units adapted for use with a three-phase alternator in an automobile or the like.

2. The Prior Art

The function of a regulator in a modern vehicle is to control the voltage produced by the alternator, in spite of fluctuations in load and in the angular velocity of the engine. The battery should be charged in as short a time as possible without an overvoltage condition nor an overcurrent condition, and the available voltage from the regulator should not be dependent of the state of charge of the battery. These objects are attained when the regulator maintains the available voltage at a constant level. Reverse current is blocked by the diode rectifier incorporated into the alternator, and the alternator construction itself features current limitation.

It has been conventional in the past to employ electromechanical voltage regulators and, more recently, transistor regulators which function to switch on and off the current flow through an exciting winding of the alternator. The functions of the voltage regulator are therefore carried out by means of transistors and diodes operating as switches. Typically, such switches function to activate the exciter current as soon as the output voltage of the alternator is lower than a desired value, and to switch off the current as soon as the alternating voltage exceeds an upper limit. In such a system, a simple two-point regulation is provided in which the switching hysteresis is approximately 0.2 volts.

Such regulators have been subject to the disadvantage that if the battery is disconnected, as by disconnecting a cable during maintenance or the like, high voltage peaks can occur, which may damage either the regulator or other electrical equipment of the automobile or both.

More and more electrical equipment is coming into common use with automobiles, and it is therefore necessary to prevent excessive voltage peaks from the alternator which can damage such equipment. The damaging voltage peaks may arise in several ways:

1. When the regulator is connected to the alternator and the battery is disconnected, leaving no load on the alternator.
2. When the regulator is connected to the alternator and the battery is disconnected, leaving only the ignition as a load on the alternator.
3. When the regulator is connected to the alternator and the battery is disconnected, along with the entire load represented by other electrical equipment.
4. When the regulator is connected to the alternator and the battery and the entire load are disconnected simultaneously, leaving only the ignition as a load on the alternator.

The regulator, as well as other electrical equipment, must be protected against such voltage peaks, and it is also necessary to protect the regulator against damage resulting to it from sudden disconnection of any of its electrical leads.

SUMMARY OF THE PRESENT INVENTION

It is a principal object of the present invention to provide a regulator by which sudden high voltage transients may be avoided, and which is not susceptible to damage as the result of sudden changes in the electrical load on the alternator.

Another object of the present invention is to provide a regulator which is economical in construction and design.

A futher object of the present invention is to provide a regulator which may readily be adapted for use with individual electrical equipment.

Another object of the present invention is to provide a regulator having overvoltage protection, which may be formed as a small and compact unit, and which may be mounted in any desired position.

Another object of the present invention is to provide a regulator which is light in weight and small in volume.

A further object is to provide a regulator having good heat-dissipating characteristics, and which avoids local overheating of the components of the regulator.

A further object of the present invention is to provide a regulator construction which is substantially waterproof and splashproof, and which is mechanically sealed.

A further object of the present invention is to provide a regulator having means for establishing a desired temperature coefficient.

These and other objects and advantages of the present invention will become manifest by an examination of the following description and the accompanying drawings.

In accordance with one embodiment of the present invention, there is provided a regulator having a housing consisting of heat-conductive material, having cooling vanes, conductor means connecting the regulator with an alternator, an electronic control circuit supported within the housing comprising a thick-layer hybrid circuit supported on an insulating substrate with burned-in conductor paths and resistances and with discrete capacitors and semiconductors, and a protective diode constructed on a separate metallic substrate plate functioning as an overvoltage protection unit, such separate metallic substrate plate being arranged next to the insulating circuit substrate, with both substrates being connected in heat-conductive relationship with the housing.

BRIEF DESCRIPTION OF THE DRAWINGS

Reference will now be made to the accompanying drawings, in which.

DESCRIPTION OF THE PREFERRED EMBODIMENT

Figure 1:
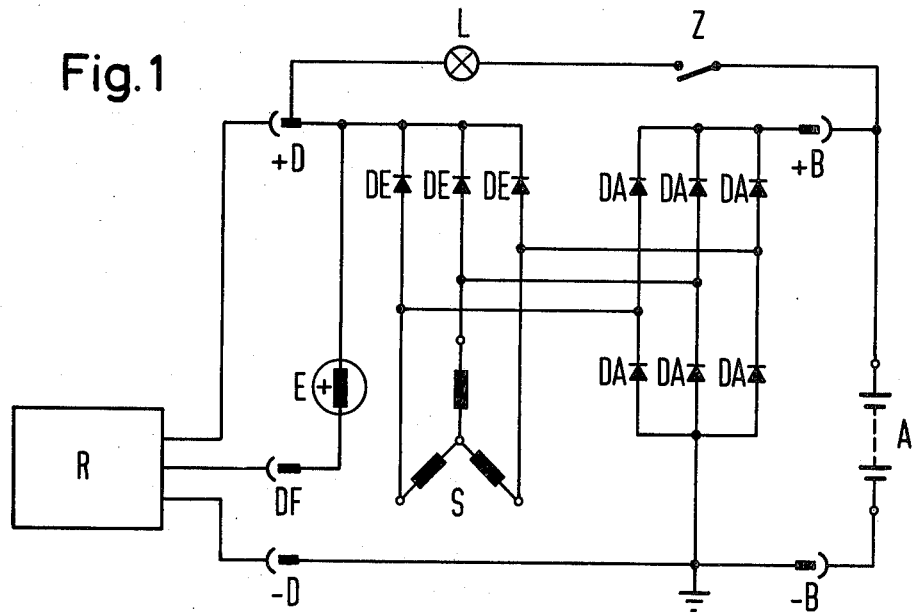
FIG. 1 is a schematic circuit diagram of a portion of the electrical system of an automobile, illustrating the voltage regulator in block diagram form.

Referring first to FIG. 1, a circuit diagram of a portion of the electrical system of an automobile is illustrated. The stator winding S of a three-phase alternator is illustrated in diagrammatic form, and the three terminals of the stator winding S are connected to the three inputs of a three-phase full-wave rectifier incorporating six diodes DA. The six diodes DA are connected in two groups of three each, the diodes of each group being connected in common to a separate output terminal. One output terminal is identified in FIG. 1 as the +B terminal, while the other is identified as the −B terminal. The −B terminal is also connected to ground and to a −D terminal. A battery A is connected between the +B and −B terminals, and the other electrical equipment of the vehicle is connected across the battery, by individual switches, in the conventional manner.

Three additional diodes DE are connected as the upper half of a full wave rectifier defined by diodes DA and DE, and are adapted to produce a positive potential at an output terminal identified in FIG. 1 as +D. The +D terminal is connected to one end of an exciting winding E of the alternator, which winding is carried by the rotor of the alternator. The other end of the exciting winding E is connected to a terminal DF and to the regulator R. The regulator R is also connected by a second wire to the +D terminal, at which the output voltage produced by the half-wave rectifier incorporating the diodes DE is available, and by a third wire to the −D terminal, which is grounded. The function of the voltage regulator R is to control the current flowing through the exciting winding E in order to regulate the voltage output of the three-phase alternator. In this way, the voltage appearing between the +B and the −B terminals is maintained at a constant value.

An ignition switch Z is connected from the +B terminal through a control lamp L to the +D terminal. The lamp L lights to indicate a difference in the voltage level between the +B terminal and the +D terminal.

Figure 2:
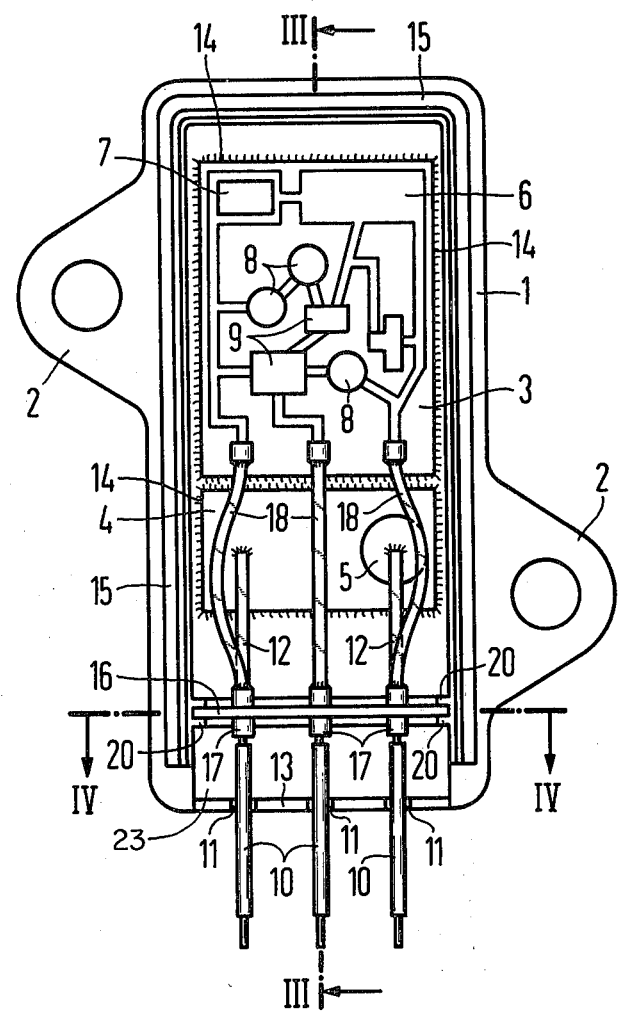
FIG. 2 is a plan view of the interior of a regulator unit constructed in accordance with an exemplary embodiment of the present invention.

In FIG. 2 is shown the interior of the housing 1 which forms the exterior surface of the regulator R. The housing 1 is formed in one piece as a hollow member having a pair of lugs 2 by which the housing may be mounted. Within the housing 1, a first substrate 3, formed of insulating material, and a second substrate 4, formed of metallic material, are both attached to the housing 1 at recesses 24 and 25 by heat-conducting cement or the like, so as to maintain good heat-conductive contact with the housing 1. A zener diode 5 is mounted on the metallic substrate 4, and a pair of conducting ribbons or bands 12 connect the two terminals of the diode 5 to two of three terminal lugs 17, to which are connected conductors 10 which serve as the output leads of the regulator.

The substrate 3 contains a thick-layer hybrid circuit having printed circuit paths formed thereon, and burned-in conductor paths and resistors 6 formed in a manner well known to those skilled in the art. In addition, discrete components, such as capacitors 7, diodes 8, and transistors 9, are mounted on, and connected to, the substrate 3 by conventional techniques, such as reflow soldering or the like. Connections are established between the hybrid circuits supported on the substrate 3 and the three output leads 10 of the regulator R by means of conducting ribbons or bands 18, which interconnect conductive paths on the substrate 3 with the terminal lugs 17. The lugs 17 are mounted on an insulating plate 16, which is held in place by a pair of abutments 20, which together describe a groove into which the plate 16 is insertable. The plate 16 divides the interior of the housing 1 into two chambers, the lower one of which contains only the conductors 10.

The conductors 10, by which the regulator is connected to the other components in the electrical circuit of FIG. 1, are guided through the windows 11 formed in an end wall 13 of the housing 1, and one end of each of the conductors 10 is secured to a separate terminal lug 17.

Figure 3:
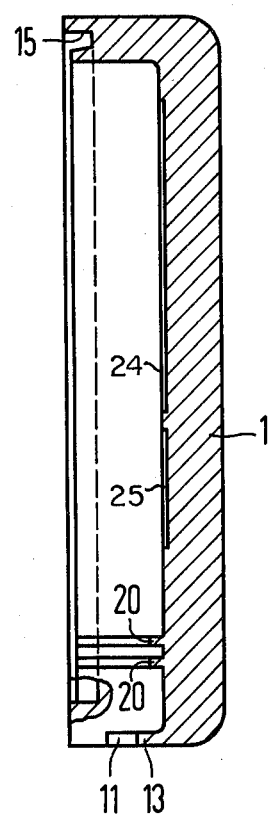
FIG. 3 is a cross-sectional view of the apparatus illustrated in FIG. 2, taken along the section line III—III.

A peripheral groove 15 is provided around the periphery of the open side of the housing 1, as best illustrated in FIGS. 2 and 3. This side of the housing is adapted to be closed with a lid 22, illustrated in FIGS. 5 and 6. The lid 22 has a peripheral projection 21, which is adapted to be received into the groove 15 to provide a tight connection between the lid 22 and the housing 1. The end wall 13 of the housing 1 is shorter than the side walls and the opposite end wall, to provide a gap between the wall 13 and the lid 22. Through this gap, synthetic resin 23 is poured into the chamber defined by the wall 16, encapsulating the inner ends of the conductors 10 and providing good mechanical and moisture-proof sealing.

The housing 1 is preferably formed of a material having good heat-conductivity properties, such as aluminum or an aluminum alloy.

Figure 4:
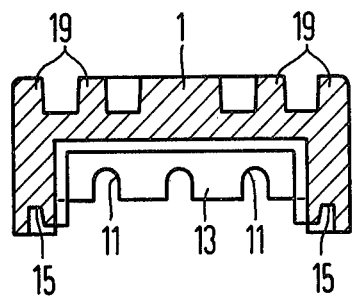
FIG. 4 is a cross-sectional view of the apparatus illustrated in FIG. 2, taken along the section line IV—IV.

As best shown in FIG. 4, the exterior of the housing, on the side opposite from the side closed by the cover 22, is provided with a plurality of fins 19, which promote radiation of heat from the housing.

Figure 6:
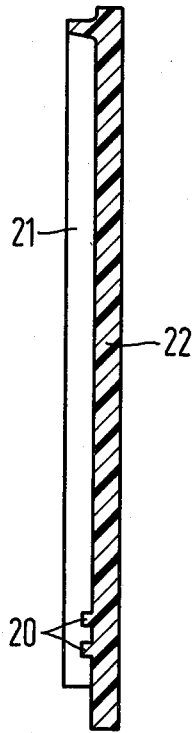
FIG. 6 is a cross-sectional view of the apparatus illustrated in FIG. 5, taken along the section line VI—VI.
Figure 5:
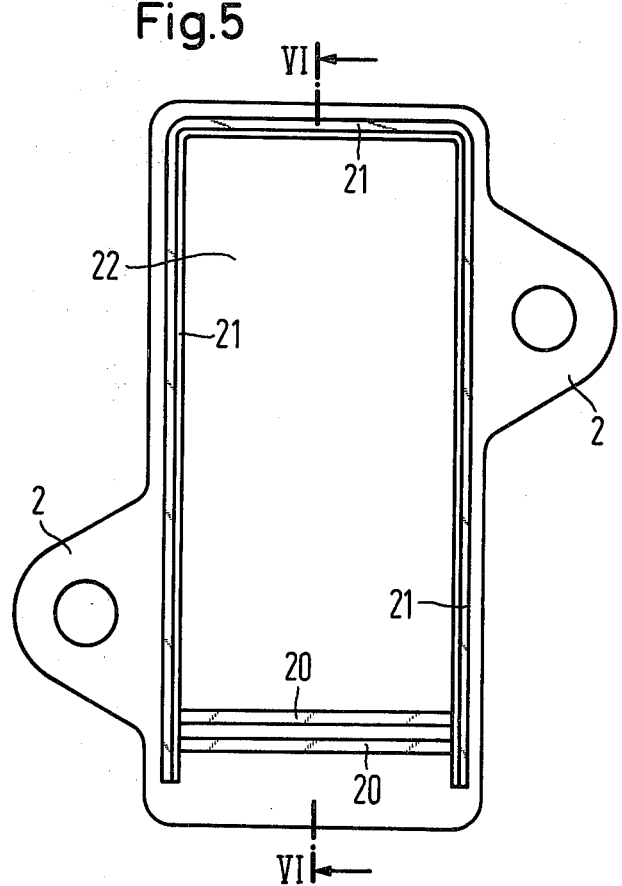
FIG. 5 is a plan view of the interior of a lid adapted to be used with the unit illustrated in FIGS. 2-4.

The lid illustrated in FIGS. 5 and 6 is preferably formed of a heat-insulating plastic and preferably has a reflective coating on its outer surface. In addition to the peripheral projection 21 which is formed integrally with the lid 22, a pair of projections or abutments 20 are provided on the lid at places corresponding to the abutments 20 on the housing 1, so that the wall 16 is retained in position by the abutments 20 on both the housing and the lid. The lid is also provided with a pair of lugs 2 aligned with the lugs of the housing, to assist in retaining the lid in position relative to the housing.

Since insulating material is chosen for the lid 22, the regulator may be mounted in direct contact with the alternator, and the lid 22 prevents heat generated in the alternator from being conducted into the regulator housing.

Figure 7:
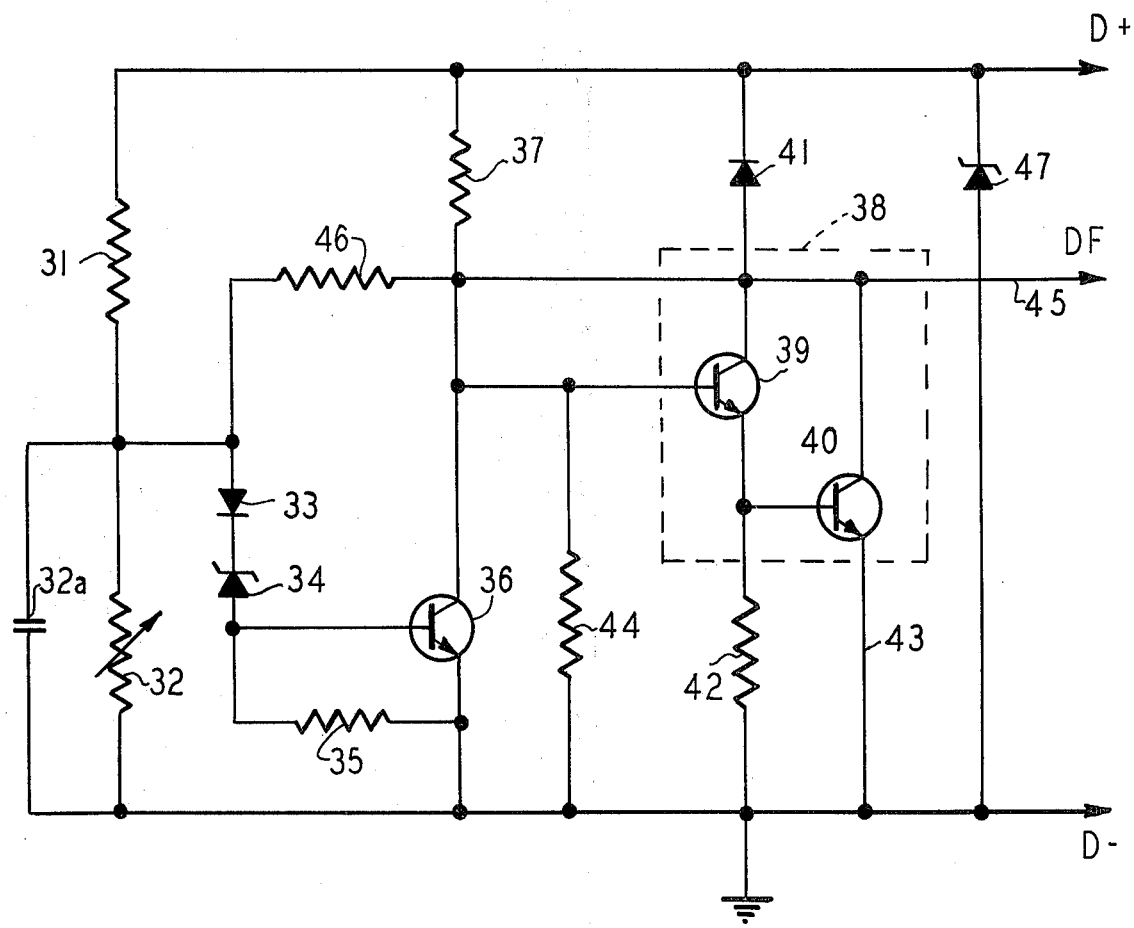
FIG. 7 is a schematic circuit diagram illustrating the electrical circuit of the regulator.

Referring to FIG. 7, the schematic circuit diagram of the regulator circuit is illustrated. An input voltage divider comprising resistors 31 and 32 is connected between the D+ and D− terminals. A capacitor 32a is connected in parallel with the resistor 32. The output of the voltage divider is connected to ground through a diode 33, a zener diode 34, and a resistor 35. The base and emitter terminals of a transistor 36 are connected across the resistor 35, and its collector is connected through a resistor 37 to the D+ terminal. If the potential difference between D+ and D− is greater than a predetermined value, the voltage level at the output of the voltage divider 30 exceeds the zener voltage of the zener diode 34 and conducts current, turning on the transistor 36. The potential at the collector of the transistor 36 then falls and turns off a Darlington circuit 38 which is connected thereto. The Darlington circuit 38 is preferably provided in the form of a single chip incorporating a pair of transistors 39 and 40, the emitter of the transistor 39 being connected directly to the base of a transistor 40, and the collectors of the two transistors being connected together in typical Darlington circuit fashion. The two collectors are connected to the DF terminal, and the emitter of the transistor 39 is connected to ground through a resistor 42. The emitter of the transistor 40 is connected directly to ground by a line 43. A resistor 44 is connected from the base of the transistor 39 to ground. A diode 41 is connected between the D+ and DF terminals, to prevent the latter from having a potential greater than that of the former.

As long as the potential between the D+ and D− terminals is less than the predetermined value, the transistor 36 remains cut off, and the Darlington circuit 38 conducts. Current flows through the resistor 37, enabling the transistor 39, which drives the output transistor 40, which functions to sink current from the line 45 connected to the terminal DF. This enables the exciting winding E to conduct current, so as to cause the alternator to produce an output voltage. When the potential between the D+ and D− terminals exceeds the predetermined level, the transistor 36 becomes conductive, and the potential at the input of the Darlington circuit 38 falls, thereby cutting off the Darlington circuit and restricting current flow through the line 45 from the terminal DF. A feedback resistor 46 is connected from the collector of the transistor 36 to the output of a voltage divider 30.

It is apparent that the Darlington circuit 38 is effective to draw current through the line 45 from the terminal DF in accordance with the voltage difference between the D+ and the D− terminals. The effect of this operation is to maintain the potential difference between these terminals at a relatively constant value within plus or minus 0.1 volts.

The regulator can be designed such that the temperature response of the generator voltage is zero or negative, so that the battery charging voltage is constant or increases with decreasing temperature, as desired. This is determined by the temperature response of transistor 36, zener diode 34, and diode 33, which are selected to give the desired temperature characteristic.

The regulator is protected against overvoltages by a power zener diode 47, connected in shunt with the terminals D+ and D−, which limits the voltage across the regulator. This protective circuit also assures that the reverse voltage of the diodes will not be exceeded and the regulator destroyed if a wire breaks or is otherwise disconnected in a battery lead or connecting lead. Besides meeting the normal operating requirements, the voltage regulator of the present invention thus also meets the extreme requirements for preventing damage when the battery and/or the load is suddenly removed.

The alternator voltage is regulated to the required charging voltage of the battery, e.g., 14.3 Vdc, when a 12 V battery is used.

The elements of the regulator, except for the diode 5, are mounted on the substrate 3, which has a thickness of about 0.8 mm. The unencapsulated passivated semiconductor chips for the transistors and diodes are bonded to the contact areas of the thick-film substrate, and the function of the regulator is then adjusted by trimming the resistor 32 with a laser. This adjustment is necessary because the voltage characteristics of zener diodes exhibit considerable scatter, and individual adaptation to the battery is essential. One advantage of thick-film technology resides in the ease of adjustment on the substrate on which the active elements have already been mounted. Unlike potentiometer trimming, the avoidance of moving elements assures that this adjustment will not be influenced by mechanical vibration during operation. This is of particular importance when the regulator is used in an automobile or other motor vehicle.

The regulator described above functions in the temperature range of −40° to +100°C, and is effective to prevent overvoltage conditions, so as to avoid damage both to the regulator and to the other electrical devices connected as parts of the electrical system.

It will be apparent that various modifications and additions may be made in the apparatus illustrated and described herein, without departing from the essential features of novelty involved, which are intended to be defined and secured by the appended claims.

What is claimed is:

1. A voltage regulator for the electrical system of a motor vehicle, adapted to control the voltage level developed by an alternator so as to conform to a desired value, said regulator comprising a housing formed of a heat-conducting material, said housing being open on one side, a lid for closing said open side, said lid being formed of a heat-insulating material, said housing having a peripheral groove, and said lid having a corresponding peripheral projection, said projection being received in said groove when said lid is in position on said housing, a wall for dividing the interior of said housing into interior and exterior chambers, said wall carrying a plurality of solder lugs, an insulating substrate plate incorporating burned-in conductor pads and resistors and supporting discrete capacitors and semiconductor chips thereon, a metallic substrate plate for supporting a semiconductor diode for overvoltage protection of the regulator, said metallic and said insulating substrate plates being inserted in corresponding recesses in said interior chamber of said housing and connected to said housing by means of a heat-conductive cement, means connecting said solder lugs on the interior side of said wall to said substrate plates, said solder lugs being adapted for connection on the exterior side of said wall to said alternator, and a synthetic resin filling said exterior chamber.

2. The regulator according to claim 1 wherein said wall is supported in a groove defined between two abutments formed on the interior surface of said housing and of said lid respectively.

3. The regulator according to claim 1, wherein said lid is formed of heat-insulating plastic.

4. The regulator according to claim 1, wherein said housing is formed of aluminum or an aluminum alloy.

* * * * *